United States Patent [19]

Brown

[11] Patent Number: 4,818,031
[45] Date of Patent: Apr. 4, 1989

[54] RAPID MOUNT TRACTION TIRE FOR FORKLIFTS AND THE LIKE

[76] Inventor: Robert J. Brown, 3297 Bedford Rd., Hastings, Mich. 49058

[21] Appl. No.: 108,683

[22] Filed: Oct. 15, 1987

[51] Int. Cl.$^4$ ............................................. B60B 11/00
[52] U.S. Cl. ................................. 301/36 R; 301/111; 301/40 S
[58] Field of Search ................. 301/36 R, 40 R, 40 S, 301/41 R, 108 SC, 6 R, 6 D, 9 CN, 9 DH, 111, 114, 118

[56] References Cited

U.S. PATENT DOCUMENTS

| | | | |
|---|---|---|---|
| 1,972,839 | 9/1934 | De Graw | 180/15 |
| 2,090,249 | 8/1937 | Contratto | 180/15 |
| 3,068,049 | 12/1962 | Smith | 301/36 R |
| 3,082,040 | 3/1963 | DeGerness | 301/39 R |
| 3,495,672 | 2/1970 | Barr | 130/48 |
| 3,664,709 | 5/1972 | Barré | 301/36 R |
| 3,840,273 | 10/1974 | Johns | 301/36 R |
| 3,890,010 | 6/1975 | Dove, Jr. et al. | 301/52 |
| 4,007,968 | 2/1977 | Solis | 301/38 R |
| 4,214,792 | 7/1980 | Hardowicke et al. | 301/36 R |
| 4,261,621 | 4/1981 | Fox | 301/36 R |
| 4,305,621 | 12/1981 | Snell et al. | 301/40 |
| 4,333,688 | 6/1982 | Lemmon et al. | 301/36 R |
| 4,526,425 | 7/1985 | Schroeder | 301/36 R |

Primary Examiner—Robert B. Reeves
Assistant Examiner—Russell D. Stormer
Attorney, Agent, or Firm—Price, Heneveld, Cooper, DeWitt & Litton

[57] ABSTRACT

An adaptor assembly for removably mounting a traction wheel that is a partially inflated conventional automotive or turf tire on a conventional automotive or trailer rim, to each of the driven wheels of a forklift. The adaptor assembly has a mounting assembly semi-permanently attached to the driven wheel and a traction tire assembly including a spacer sleeve attached to the traction wheel. An anchor member extends through a bore in the spacer sleeve and threadably engages a central hole in the mounting assembly to anchor the traction tire assembly to the mounting assembly. Drive pins extending from the spacer sleeve engage small openings in the mounting assembly adjacent the central hole to transmit torque between the wheels. In one embodiment, the anchor member is hollow with an inner diameter larger than the hub of the driven wheel so that a protruding hub may be accommodated.

12 Claims, 2 Drawing Sheets

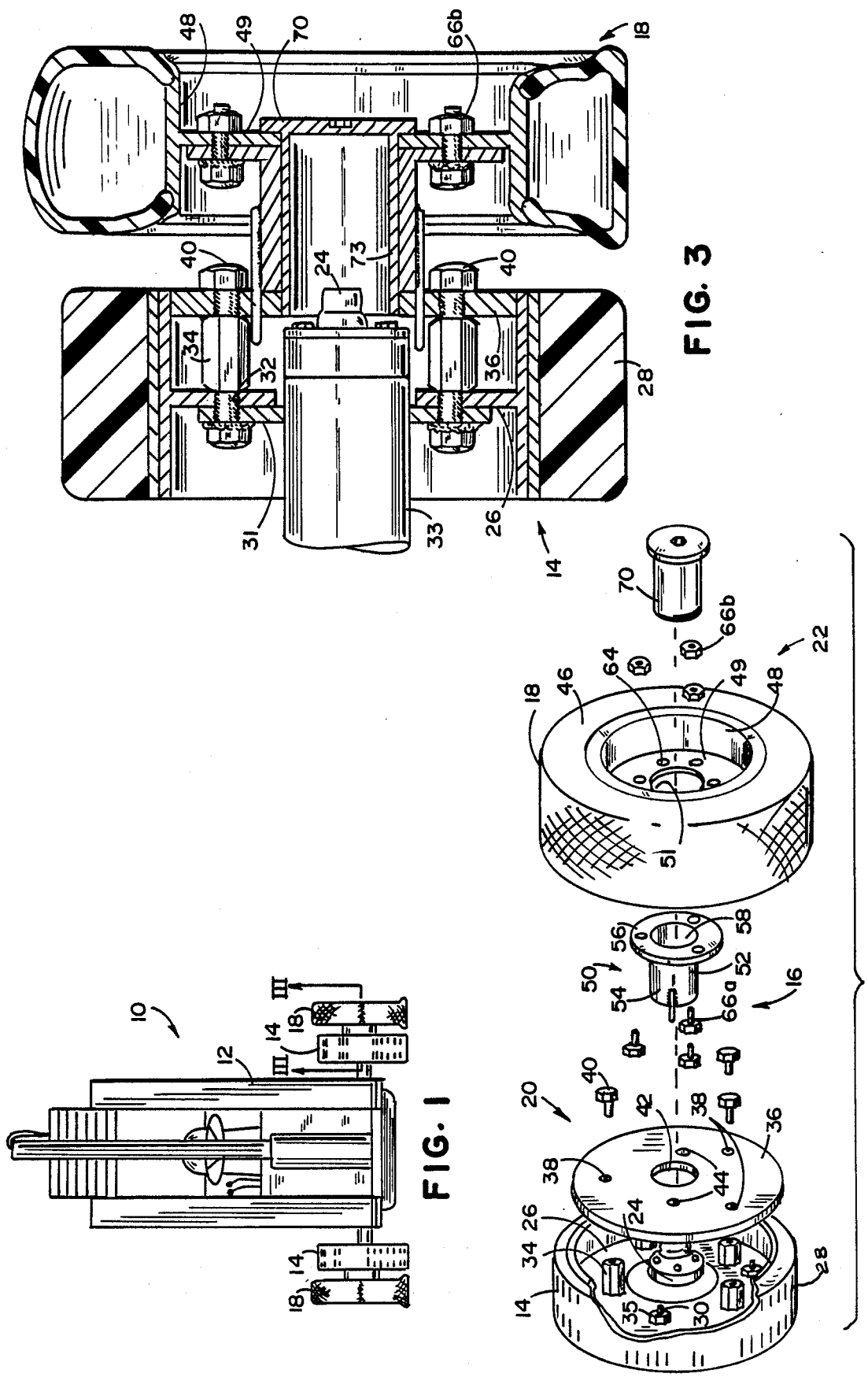

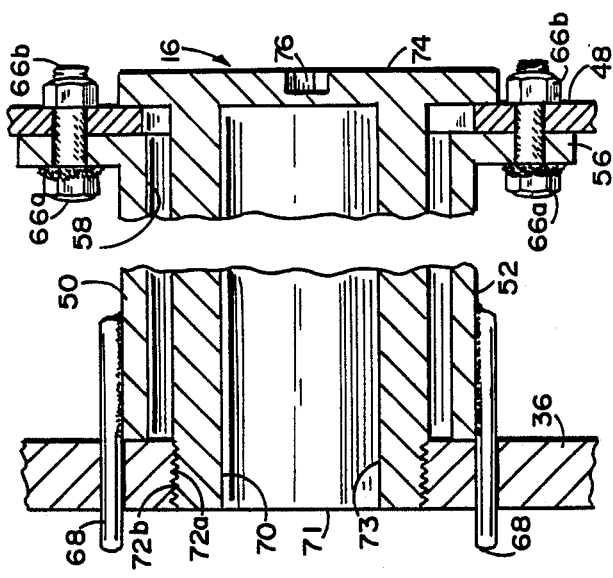
FIG. 7
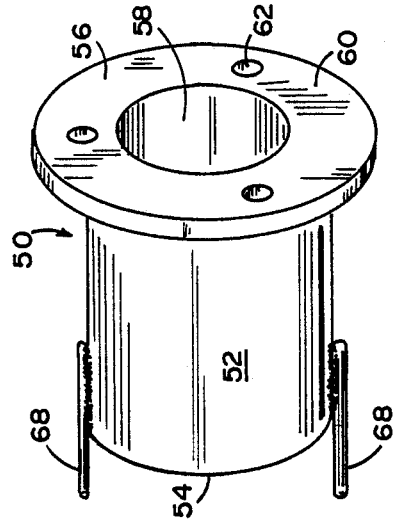
FIG. 6
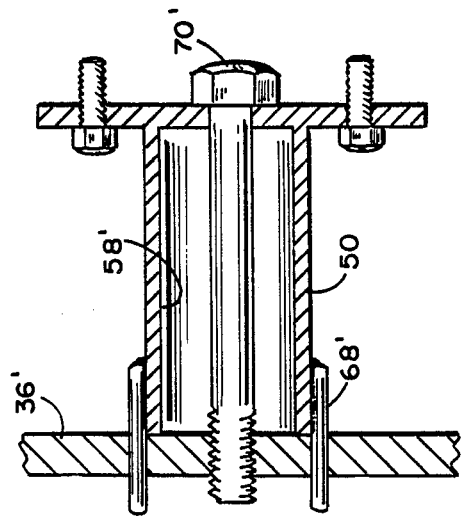
FIG. 9
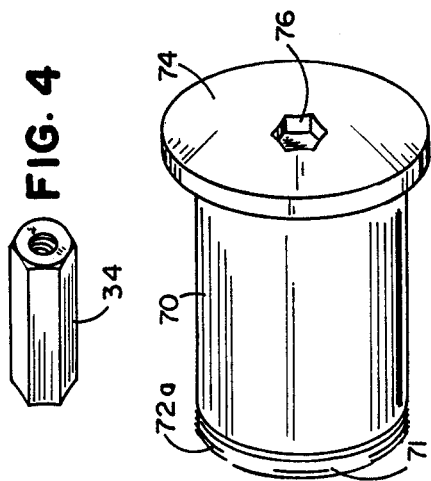
FIG. 4
FIG. 5
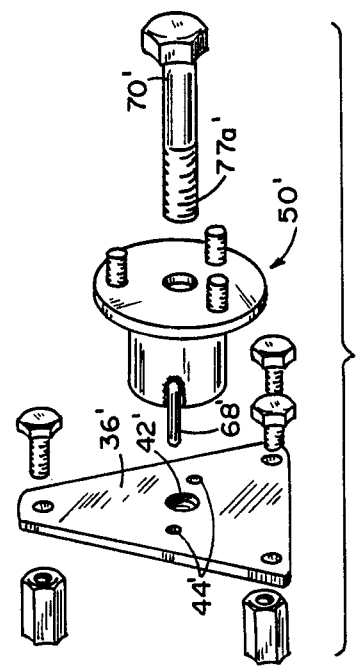
FIG. 8

RAPID MOUNT TRACTION TIRE FOR FORKLIFTS AND THE LIKE

BACKGROUND OF THE INVENTION

This invention relates to an adaptor assembly for removably attaching a second, traction wheel to each of the conventional driven wheels of a material-handling implement such as a forklift truck.

Forklift trucks and the like are provided with solid-rubber tires and very hard pneumatic tires which are designed primarily for operation on hard or well-packed surfaces. Such tires have very little flexibility and, as a result, provide poor traction if operated on nonpaved surfaces and are substantially useless if the surface is inclined.

Accordingly, the present invention provides an adaptor assembly for removably attaching a second wheel to each of the forklift driven wheels with the second wheel having a tire maintained at a relatively low pressure to provide good traction for the forklift. An adaptor assembly according to the present invention is designed to function with a conventional automotive tire rim and conventional automotive or turf tire as the traction wheel.

The addition of auxiliary traction tires to a forklift adds considerable width to the vehicle and makes it less maneuverable. Because a forklift is typically primarily used indoors on hard surfaces, where the auxiliary traction tires are not desirable, it is important that the tractor tires be very easily mounted to and removed from the forklift. The present invention provides a traction wheel assembly that may be easily and quickly mounted to the forklift when additional traction is desired and removed therefrom when the forklift is returned to normal service.

Because the purpose of the second wheel is for traction only, the structure of the adaptor assembly is primarily directed to transmitting torque from the driven wheel to the traction wheel rather than in supporting a substantial portion of the weight of the forklift on the second wheel. Accordingly, the present invention provides an adaptor assembly that requires minimum material mass and, therefore, minimizes the weight added to the vehicle.

In a conventional forklift truck, the driven wheels are the front wheels. A gear assembly is therefore normally included within the hub to which each of the driven wheels is attached. It is therefore necessary that this hub be readily accessible for service and maintenance. The present invention provides an adaptor assembly for removably mounting a second, traction wheel to each of the drive wheels while allowing ready access to the hubs of the drive wheels.

SUMMARY OF THE INVENTION

A traction wheel adaptor assembly according to the invention has a mounting assembly portion including an anchor plate for attachment to the driven wheel of a forklift. The anchor plate has a central hole therein and one or more smaller openings adjacent the central hole. Means are provided for detachably mounting the plate to the driven wheel. A wheel assembly portion of the adaptor assembly includes a spacer sleeve having a central bore therethrough and opposite end surfaces. Means are included for attaching one end surface of the spacer sleeve to a conventional automotive tire rim. These means may include an annular flange having studs arranged in a typical automotive rim stud pattern. A second surface of the spacer sleeve has an end surface designed to seat throughout its entire circumference against the flat surface of the anchor plate and also has one or more drive pins extending therefrom for engagement with the smaller openings in the anchor plate to transmit torque from the driven wheel to the traction wheel. Attachment means, such as a anchor member extending through the bore of the spacer sleeve, engages the central hole in the anchor plate for attaching the wheel assembly portion of the adaptor assembly to the mounting assembly portion.

These and other related objects, advantages and features of this invention will become apparent upon review of the following specification in conjunction with the drawings.

BRIEF DESCRIPTION OF THE DRAWINGS

FIG. 1 is a front elevational view of a forklift truck modified according to the invention;

FIG. 2 is an exploded perspective view of an adaptor assembly according to the invention as it is applied to the forklift truck in FIG. 1;

FIG. 3 is a sectional view taken along the lines III—III in FIG. 1;

FIG. 4 is an enlarged perspective view of a spacer stud used in the invention;

FIG. 5 is an enlarged perspective view of an embodiment of the anchor member used as an attachment means for attaching the first and second portions of the adaptor assembly together;

FIG. 6 is an enlarged perspective view of a spacer sleeve according to the invention;

FIG. 7 is an enlarged sectional front elevational view of an assembled adaptor assembly according to the invention;

FIG. 8 is an exploded perspective view of an alternative embodiment of the invention; and FIG. 9 is an enlarged fragmentary sectional front elevational view of the embodiment shown in FIG. 8 shown in the assembled state.

DESCRIPTION OF THE PREFERRED EMBODIMENT

Referring now specifically to the drawings and the illustrated embodiments depicted therein, a material-handling implement such as a forklift truck 10 has a body 12 and a pair of driven front wheels 14. The front wheels 14 are illustrated as being of the nonpneumatic, solid tire type conventionally used on this type of equipment. An adaptor assembly 16, according to the invention, is provided to mount a second, traction wheel 18 to each driven wheel 14 of the forklift (FIG. 2). In many makes of equipment of the type with which this invention is intended to be used, the hubs of the driven wheels encase gear mechanisms which must be accessible for service. Also, these mechanisms may occupy a major portion of the center of the wheel. To make the invention universally usable, it should be capable of adaptation to wheels having either type of hub structure.

As seen in detail in FIGS. 2 and 3, adaptor assembly 16 has a mounting assembly 20 that is semi-permanently mounted to the driven wheel 14 and a wheel assembly, shown generally at 22, that i semi-permanently mounted to the traction wheel 18. An anchor member 70 is provided to removably attach wheel assembly 22 to mounting assembly 20.

Each driven wheel 14 includes a central hub assembly 33, including an outer hub portion 24 and a mounting disk 31, which mounts a wheel having a support web 26 extending radially outward from the hub assembly and a tire 28 attached to the web. A plurality of lugs 30 extending outwardly from disk 31 are received in aligned openings 32 in web 26 for attachment of wheel 14 to the hub assembly. Three internally threaded spacers 34 are substituted for an equal number of the factory-applied nuts 35 on the lugs. The spacers are so shaped that they can be manipulated by a wrench (FIG. 4).

Mounting assembly 20 additionally includes an anchor plate 36 having a plurality of openings 38 located in alignment with the spacers 34. Fastening means, such as threaded fasteners 40, extend through openings 36 and threadably engage the spacers 34 to provide attachment means for attaching the anchor plate to the driven wheel 14. The length of spacers 34 is preselected to locate plate 36 approximately flush with the outer edge of tire 28.

Anchor plate 36 is provided with an enlarged threaded central hole 42. Hole 42 is sufficiently large that, with anchor plate 36 mounted to wheel 14, the outer hub portion 24 is accommodated by hole 42. A pair of openings 44 are provided in plate 36 in proximity to hole 42. The function of openings 44 will be described in detail below.

Traction wheel 18 includes a pneumatic tire 46 mounted on a rim 48. Rim 48 and tire 46 are preferably standard conventional automotive or trailer equipment and tire 46 is preferably a so-called turf tire and inflated to a relatively low pressure, such as 15–20 P.S.I.G. Wheel assembly 22 includes a spacer sleeve 50 having a tubular section 52, flat inner end surface 54, an outer annular flange 56 and a bore 58 through a central axis of the sleeve. The length of the spacer sleeve is such that the traction wheel 18 will be spaced a sufficient distance from the wheel 14 such that, when the traction wheel is installed on the drive wheel, chains may be mounted to the traction tire so that the forklift may be operated on snow or ice. A plurality of studs 66a are mounted to the flange 56 and arranged in a pattern to align with the standard lug openings 64 in the rim 48 of the traction wheel. Lug nuts 66b retain the traction tire rim to studs 66a. Studs 66a may take the form of a bolt welded into an opening in the flange.

Spacer sleeve 50 further includes a pair of drive pins 68 attached to tubular section 52 and extending outwardly beyond end surface 54. Drive pins 68 are welded to the exterior surface of the tubular section and are aligned with the openings 44 in plate 36 so that they are received therein when the wheel assembly is joined with the mounting assembly. If plate 36 is sufficiently thick, it is not necessary for openings 44 to penetrate entirely through the plate. The purpose of pins 68 is to transmit torque from wheel 14 to traction wheel 18. Because it is not necessary for wheel 18 to substantially support the weight of the forklift, the present adaptor assembly is sufficient to perform the traction function without adding excessive material weight to the vehicle.

With spacer sleeve 50 mounted to tire 18 and the drive pins 68 seated in the openings 44, an anchor member 70 is extended through a central aperture 51 in rim 48, through bore 58 and into engagement with central hole 42 to provide fastening means for fastening the portions of the adaptor assembly together. In order to engage hole 42, anchor member 70 has threads 72a at a first end portion 71 thereof that engage corresponding threads in hole 42. Anchor member 70 additionally has a head 74 that is larger than bore 58 in order to retain the wheel assembly and press the end of the sleeve against the surface of the anchor plate 36. This bearing maintains the wheel assembly in axial alignment with the drive wheel 14. A recess 76 in head 74 is provided for engaging the anchor member with a wrench. First end portion 71 of anchor member 70 is open and an inner surface 73 of the hollow anchor member is sufficiently large such that the first portion 71 of the anchor member, which protrudes into anchor plate 36, will seat around outer hub portion 24.

In use, anchor plate 36 is semi-permanently attached to wheel 14 through spacers 34 and fasteners 40 to provide a mounting assembly 20. Annular flange 56 of neck 50 is semi-permanently attached to rim 48 of traction wheel 18. When it is desired to attach the traction wheel to the forklift driven wheel, the forklift need only be slightly elevated and the traction wheel assembly mated to the mounting assembly with pins 68 engaging openings 44. Bolt 70 is then passed through bore 58 and threadably engaged with hole 42. The procedure for removing the traction wheel is the reverse of the above. When it is necessary to perform maintenance on hub assembly 33, anchor plate 36 may be easily removed by removing fasteners 40.

FIGS. 8 and 9 illustrate an embodiment of the invention that may be used to provide an auxiliary wheel for a material-handling implement wheel (not shown) where the hub does not extend outwardly into the plane of the anchor plate. In this embodiment, an anchor plate 36' has a pair of openings 44' on opposite sides of a central hole 42'. An anchor member 70' having threads 72a' on one end thereof, extends through a bore 58' in a spacer sleeve 50'. Threads 72a' threadably engage mating threads on hole 42' to retain spacer sleeve 50' against plate 36' with a pair of drive pins 68' engaged in openings 44'.

Because the FIGS. 8 and 9 embodiment is usable with wheels having nonprotruding hubs, opening 42' may be made much smaller than opening 42 in the previously described embodiment and anchor member 70' does not have to seat over the hub. In fact, it can be a threaded opening to fit a heavy duty standard bolt such as a one inch bolt. The diameter of the spacer sleeve 50a, however, can be reduced only a minor amount without incurring the danger of axial twisting due to vertical loading. Accordingly, bore 58' and anchor member 70' are correspondingly smaller. In addition, because the central hole 42' is much smaller in this embodiment, the size of anchor plate 36' can be reduced while still providing sufficient strength to prevent warping of the plate.

Changes and modifications of the specifically described embodiments can be carried out without departing from the principles of the invention, which is intended to be limited only by the scope of the appended claims.

The embodiments of the invention in which an exclusive property or privilege is claimed are defined as follows:

1. A traction wheel adaptor assembly for removably attaching a traction wheel to a driven wheel of a vehicle outwardly therefor, said driven wheel having a hub, a web extending radially outwardly from said hub and a first set of lugs extending from said web space around said hub, said traction wheel having a standard automotive tire mounting rim including means defining a central aperture in said rim and means defining a set of stud openings in said rim spaced around said central aperture, said adaptor assembly comprising:
  an anchor plate having edge means defining a central hole in said plate and means defining a first opening in said plate adjacent said hole;
  first attaching means for attaching said plate to said traction wheel with said hole juxtaposed said hub;
  an elongated tubular spacer sleeve outwardly of said plate and having wall means defining inner and outer parallel end faces normal to a central axis thereof, said inner end face adapted to seat against said plate, said sleeve further including a first drive pin extending from said wall means beyond said inner end face and aligned with said plate opening to transmit torque from said plate to said spacer;
  second attaching means for attaching said spacer sleeve to said second wheel rim including a radially extending flange on said outer end face having an outwardly facing surface and fastening means extending from said outwardly facing surface of said flange and engageable with said stud openings; and
  anchor means for attaching said spacer sleeve to said anchor plate, said anchor means extending concentrically through said spacer sleeve and having wall means defining a head portion seating against said outwardly facing surface of said flange and an inner end opposite said head portion having engaging means for engaging said hole.

2. The adaptor assembly in claim 1 in which said engaging means comprises mating threads on said anchor means inner end and on said edge means.

3. The adaptor assembly in claim 2 in which said anchor member inner end is open and said anchor member wall means has an interior surface that is larger in diameter than said hub.

4. The adaptor assembly in claim 1 in which said first attachment means includes spacers engaging a plurality of said lugs on said first wheel web, means defining a set of lug openings in said anchor plate aligned with said spacers, and fastening means extending through said lug openings in said anchor plate for engagement with said spacers.

5. The adaptor assembly in claim 1 in which said tubular sleeve is cylindrical around said central axis.

6. The adaptor assembly in claim 5 further including means defining a second opening in said plate and a second drive pin opposite said first pin, and extending from said tubular section and engaging said second opening.

7. A traction wheel for removable attachment to a driven wheel of a vehicle outwardly thereof, said driven wheel having a hub, a web extending radially outwardly from said hub and a first set of lugs extending from said web spaced around said hub, said traction wheel comprising:
  a substantially planar anchor plate having edge means defining a central hole in said plate having threads therein and means defining a pair of openings in said plate adjacent opposite sides of said hole;
  first attaching means for attaching said plate to said drive wheel with said hole juxtaposed said hub;
  an elongated tubular sleeve having a cylindrical tubular section defining a bore extending along a central axis thereof, and opposite inner and outer end faces normal said central axis said inner end face adapted to seat against said plate and said outer one end faces including a radially extending flange, said spacer sleeve further including a pair of pins attached to the outer surface of said tubular section and extending from said tubular section beyond said first surface and aligned with said openings in said plate;
  a second wheel including a rim and means defining a central aperture therein;
  second attaching means for attaching said flange to said second wheel rim; and
  an anchor member having a head at a first end thereof larger than said bore and a second end having threads thereon, said anchor member extending through said bore with said anchor member threads engaging said hole threads to anchor said sleeve to said plate.

8. The adaptor assembly in claim 7 in which said anchor member has means defining an inner and outer surface thereof such that said anchor member is substantially hollow.

9. The traction wheel in claim 8 in which said inner surface has a diameter larger than the diameter of said hub.

10. The adaptor assembly in claim 7 in which said first attachment means includes spacers engaging a plurality of said lugs on said driven wheel web, means defining a set of lug openings in said anchor plate aligned with said spacers, and fastening means extending through said lug openings in said anchor plate for engaging said spacers.

11. The traction wheel in claim 7 in which said second wheel rim is a standard automotive tire mounting rim having a standard lug opening pattern.

12. The adaptor assembly in claim 11 in which said second attachment means includes means defining a set of lugs extending from said flange arranged in a pattern of the lug openings in said rim and nuts on said lugs.

* * * * *

UNITED STATES PATENT AND TRADEMARK OFFICE
CERTIFICATE OF CORRECTION

PATENT NO. : 4,818,031
DATED : April 4, 1989
INVENTOR(S) : Robert J. Brown

It is certified that error appears in the above-identified patent and that said Letters Patent is hereby corrected as shown below:

Column 2, line 65:

"i" should be --is--.

Column 4, line 66, claim 1:

"therefor" should be --thereof--.

Signed and Sealed this

Tenth Day of April, 1990

Attest:

HARRY F. MANBECK, JR.

*Attesting Officer*  *Commissioner of Patents and Trademarks*